United States Patent [19]

Knoll et al.

[11] Patent Number: 4,502,761
[45] Date of Patent: Mar. 5, 1985

[54] GRADIENT-FREE ILLUMINATION OF PASSIVE READOUT DISPLAY DEVICES

[75] Inventors: Peter Knoll, Ettlingen; Winfred König, Karlsruhe; Wolfgang Ziegler, Eggenstein, all of Fed. Rep. of Germany

[73] Assignee: Robert Bosch GmbH, Stuttgart, Fed. Rep. of Germany

[21] Appl. No.: 346,507

[22] Filed: Feb. 8, 1982

[30] Foreign Application Priority Data

Mar. 13, 1981 [DE] Fed. Rep. of Germany ....... 3109643
Nov. 13, 1981 [DE] Fed. Rep. of Germany ....... 3145127

[51] Int. Cl.³ .................. G02F 1/133; G02B 27/00; F21V 9/00
[52] U.S. Cl. .................... 350/345; 350/322; 350/339 F; 362/293
[58] Field of Search ............. 350/345, 339 F, 339 D, 350/322, 314; 362/293, 311, 27, 31, 32, 2

[56] References Cited

U.S. PATENT DOCUMENTS

| 2,384,578 | 9/1945 | Turner | 350/314 |
| 3,561,963 | 9/1971 | Kiba | 430/5 |
| 3,571,489 | 3/1971 | Coale | 350/314 X |
| 3,645,734 | 2/1972 | Noguchi | 430/321 X |
| 3,912,510 | 10/1975 | Marks | 430/6 X |
| 3,957,351 | 5/1976 | Stockwell | 350/345 |
| 4,206,501 | 6/1980 | Brooks | 350/345 |
| 4,383,016 | 5/1983 | Postupack | 350/314 X |

Primary Examiner—John K. Corbin
Assistant Examiner—David Lewis
Attorney, Agent, or Firm—Frishauf, Holtz, Goodman & Woodward

[57] ABSTRACT

Compensating darkening is provided over the area at the back of liquid crystal displays, so that light from one or more concentrated sources near the back of the display may result in essentially uniform illumination of the display through the LCD from the back. The compensating screen may be a developed film of suitable selected gradation, or a raster of points produced by half-tone process from such a film and printed either on a transparent foil or on the back of a translucent circuit board. Instead of being based on an exposed film, the density of the size of the raster points may be generated by a point-by-point light measurement recorded in computer memory and translated to point dimensions applied automatically by a plotter to a screen. A raster of circles with progressively wider spacing is useful for illumination by a single lamp. The layout of circles can be drawn according to a simple formula, keeping the ratio of line width to line spacing proportional to the third power of the cosine of the illumination angle.

10 Claims, 4 Drawing Figures

GRADIENT-FREE ILLUMINATION OF PASSIVE READOUT DISPLAY DEVICES

This invention deals with the illumination of readout devices of the passive type, such as the liquid crystal readout devices which are not self-luminous. In particular, the invention concerns the provision of illumination which is substantially uniform over the display provided by the device or devices.

Liquid crystal devices, usually a separate device for each alphanumeric character, are commonly mounted on a printed circuit board by which the choice of characters is selected through electrical contacts. It is known to make this circuit board of translucent material so that it serves as a diffusion screen for illuminating the liquid crystal readout devices from behind. It is also known to illuminate liquid crystals by means of a wedge of acrylic plastic into which the light of a lamp is supplied from the side of the display. Illumination through the circuit board frequently does not lend itself to providing uniform illumination and illumination through a wedge from the side is expensive and bulky, especially in equipment with a number of displays. For each display, a separate light conductor with its own lamp must be provided.

THE INVENTION

It is an object of the present invention to provide illumination of readout display devices from behind that will be uniform over the display (i.e., gradient-free) at low cost.

Briefly, a transparent foil is interposed between one or more lamps provided behind the display devices and the back of the devices, and the foil is darkened so as to transmit less light where it intercepts the paths of greater light intensity from the lamp to the display device. This can be done by providing the foil in the form of a photographic film exposed to the intensity pattern of the lamp or lamps that is incident upon the back of the display device or devices, and then developed to produce the compensating darkening. In accordance with the invention the darkening of the screen is done by providing a regular pattern of dots on a transparent foil, calculated to compensate for the variation of illumination from the lamp or lamps. When illumination is through a printed circuit board that substantially modifies the situation, a 2-dimensional array of dots prepared in accordance with determination by tests of the amount of light coming through to the various array locations at the back of the display devices has considerable advantages.

The invention has the great advantage that a single lamp can be used to illuminate a display made up of a number of liquid crystal readout devices, while the display unit as a whole can be kept small and compact, with the light source conveniently centered beneath the display devices.

The photofilm embodiments are easy to design and make, but for production in quantity a regular spot pattern on a transparent or translucent foil printed by silk screen processes are advantageous for producing high-quality results at great economy. In fact, translucent circuit plates can have a pattern of dots or the like printed directly thereon, or made thereon by etching of a copper lamination at the same time that the circuit paths are formed. Such an embodiment not only dispenses with the provision of a separate raster foil, but also saves adjusting it into registry.

A compensating screen according to the invention is preferably located directly beneath the display devices. This enables the space requirements of the display unit to be kept particularly small. It can, however, also be placed directly beneath the translucent circuit board carrying the display devices, an arrangement which is easier to assemble, particularly if a number of display devices are to be illuminated.

As already mentioned, the exposure of photosensitive film at the place where the light compensation is desired, followed by development, is useful for producing either a developed film that itself will be the compensating screen or the preparation of a master from which either the circuit board itself will be printed, or dot pattern foils will be printed for insertion at the proper place.

In the case of a screen prepared by the provision of dark circles thereon instead of dots, the circles should be spaced farther and farther apart as the distance from the most direct ray from the lamp to the display device increases. For such an embodiment, it is preferred for the circles to be so disposed that the ratio of line thickness to line spacing is proportional to the third power of the cosine of the angle between the central ray from the light source and the rays to a circle of the mean radius of the step from one circle to the next.

THE DRAWING

The invention is further described by way of illustrative example with reference to the annexed drawings, in which.

DESCRIPTION OF THE ILLUSTRATED EMBODIMENT

Figure 1:
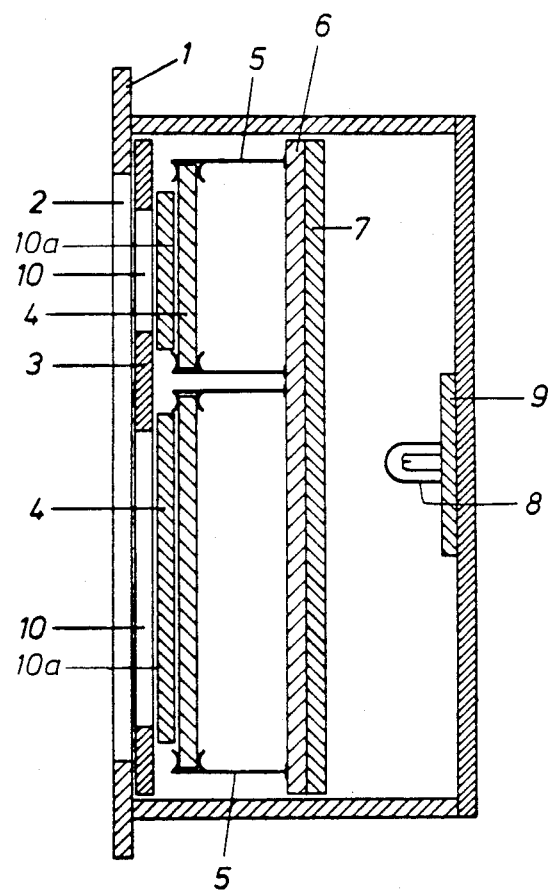
FIG. 1 is a side view, in cross-section, of a display utilizing liquid crystal readout devices illuminated by a single lamp with the interposition of a compensating screen in accordance with the invention.

FIG. 1 shows a unit in which there are two liquid crystal displays of different sizes, one above the other. A casing 1 has a viewing aperture 2, behind which a front plate 3 is fastened that has transparent windows 10, 10a. Behind each window is a liquid crystal device 4. The liquid crystal devices (LCDs) 4 are connected to the circuit paths of a printed circuit board 6 either by plugging or soldering the connection legs 5 of the liquid crystal devices. The printed circuit board 6 is made of a translucent material on which the conduction paths and certain control components, such as transistors, are mounted.

Directly behind the printed circuit board 6 is a screen 7 of developed sheet photofilm or of dot-pattern printed transparent film. As mentioned above, instead of an extraneous film bearing the light-compensating spot pattern, the pattern may be printed onto the circuit board 6 or etched out or mechanically shaped by operations on a copper lamination of the circuit board. On the back wall or "floor" of the casing 1, a lamp mounting 9 is provided in which a lamp 8 is seated.

The screen 7 is heavily darkened in the region of most direct illumination by the lamp 8, while the darkening tapers off towards the edge of the screen. When this is done by the use of a developed photofilm, what results is a "gray wedge" matching stronger absorption to surfaces that receive higher light intensity. In consequence, at the surface of the LCDs 4, the areas in question are approximately uniformly illuminated, so that light gradients are no longer noticeable.

For producing the gray wedge in the developed photofilm form, sheet film of a suitable gradation is placed, in darkness, between the lamp 8 and the printed circuit board 6 or between the lamp 8 and the LCD display 4. The lamp 8 built into the casing is then illuminated to expose the film. After the development of the film, blackening appears which is more intense where the incident light is more intense. The developed and fixed film, assuming that the exposure time and developing time were both correct in accordance with the known principles of photographic technique, is dried and then mounted against the back of the display or the back of the circuit board 6, as the case may be, with the result that the places where there is the higher incident light intensity, there is also higher darkening or shading from the "gray wedge" film.

A film exposed and developed as just described, instead of being used as the screen itself, can be used as the master for printed screens by the well-known half-tone process by which gray surfaces are converted into a raster of dots of difference size, and hence of different blackening of the printed circuit. This enables printing with black ink to produce various tones of gray. The back side of the printed circuit board 6 can be printed from such a half-tone master, or else a separate screen made of thin transparent plastic can be thus printed and applied to the back side of the circuit board, as in the case of the sheet 7 in FIG. 1.

This arrangement makes it possible to bring the lamp 8 or other suitable light sources closer to the display 4, so that the entire unit can have less space requirement in the depth dimension. Thus, the dimensions of the unit are determined essentially by the size of the display devices. If the circuit board 6 is not completely covered with display devices 4, it is possible to mount other electronic components of the circuit at the thus unoccupied or empty locations of the circuit board, so that these will not interfere with the lighting of the display devices through the circuit board. The advantages of the invention are not limited to the illumination of the backs of display devices, since even front plates can be provided with gradient-free illumination in this manner.

Figure 2:
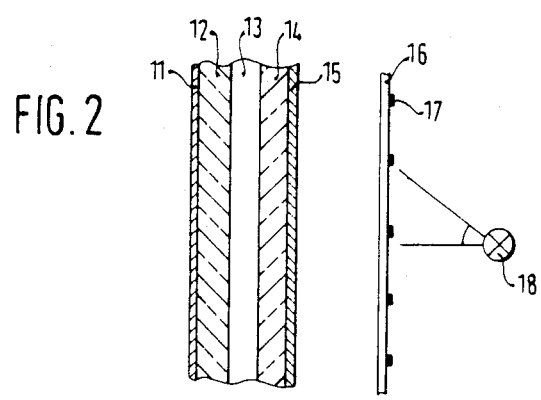
FIG. 2 is a side view, in cross-section, on a magnified scale, of a portion of a liquid crystal display device illuminated by a lamp through a compensating screen.

FIG. 2 shows a liquid crystal display device in greater detail. The LCD in this case has a polariser 11, a glass plate 12, a liquid crystal 13, another glass plate 14 and a polariser-transflector combination 15. Such an LCD is manufactured in a well-known way that does not need to be described here, these devices being commercially available from many sources.

Behind the LCD is a foil screen 16 and a lamp 18. Dot-pattern points 17 are shown on the foil 16. The illumination angle from the lamp 18 to the pattern points 17 is drawn in.

Figure 3:
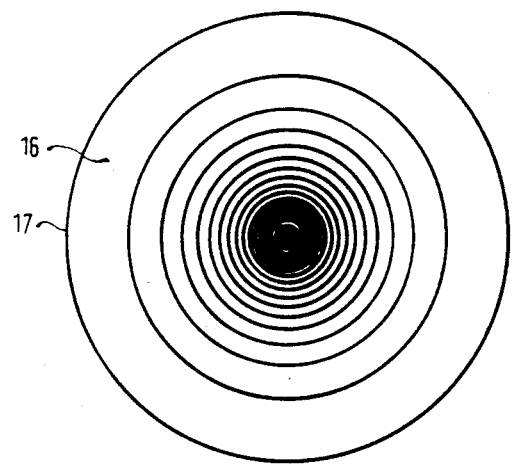
FIG. 3 is a plan view of a pattern of circles for compensating illumination of a display device in accordance with the invention.

FIG. 3 shows an example of an embodiment of the patterns foil 16 with the opaque pattern points forming continuous circles, drawn in a manner suitable for compensating for the illumination of an LCD in a configuration illustrated in FIG. 2.

If the display device is illuminated from only one point source of light and if the conduction paths and small components not shown in FIGS. 1 and 2 are uniformly distributed over the circuit board, which is likewise not shown in FIG. 2, the locally transmitted light flux, because it is proportional to the illumination intensity on the back side of the foil 16, is proportional to the third power of the cosine of the illumination angle. Consequently, for reducing the average transmitted light flux and thereby the local illumination intensity of the display device, to a uniform level, and thereby obtaining gradient-free illumination, a circular line filter, as illustrated in FIG. 3, can be used which has the ratio of line width to line spacing that changes in proportion to the third power of the cosine of the illumination angle. If uniformly distributed components are present between the LCD and the lamp 18, the spacing of the circles from each other may need to be experimentally determined to take account of that factor. By this procedure for providing a compensating filter, exposure of sheet photographic film as previously described is dispensed with. The circle spacings can be calculated approximately by theoretical considerations and directly applied to the raster film 16.

Figure 4:
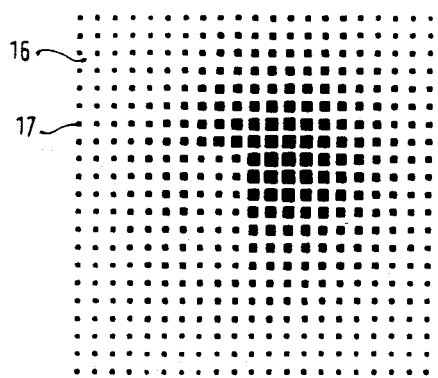
FIG. 4 is a plan view of a dot pattern prepared so as to take account of obstructions on a circuit board, as well as the variation of intensity of incident illumination.

In the more general case, a regular dot-pattern screen according to FIG. 4 may be preferable. In this case, it is possible to utilize two or more light sources and to tolerate some non-uniform distribution of the electrical components present between the LCD and the lamp 18. For this purpose, the light intensity distribution on the LCD in front of the polarizer 11 is measured on a point-by-point basis in the absence of any screen 16. The point of minimum light intensity determines the level of illumination of the entire LCD. The points of higher light intensity are darkened by regularly spaced dots 17, so that there also the minimum light intensity is provided. The pattern dots 17 are accordingly the greater, the higher the light intensity originally was at this point. FIG. 4 shows an example of such a case. In such cases the provision of regularly spaced pattern dots of suitable size can be calculated by means of a computer appropriately interconnected with a point-by-point light intensity measuring system, and the values recorded in the computer memory can then be transferred by means of an x,y plotter, as suitable dots, to the raster screen foil. This system is likely to be found advantageous particularly for small quantity production. This method has the advantage that the steps involving development of sheet film are unnecessary, and experiments necessary to find the proper gradation for the photofilm to be used are likewise dispensed with.

Although the invention has been described with reference to particular illustrative embodiments, it will be recognized that modifications and variations are possible within the inventive concept.

We claim:

1. An illuminator for translucent illumination of liquid crystal information-display comprising a light source mounted in fixed relation to a passive readout display and a printed foil interposed therebetween having a pattern of opaque spots regularly spaced in two dimensions and providing darkening by variation in the size of said spots over area covered by said pattern, in a manner compensating for variations in the incident illumination provided by said light source to said display devices, whereby substantially gradient-free illumination of said passive readout display is produced.

2. An illuminator as defined in claim 1, in which said raster foil is located adjacently underneath said display devices.

3. An illuminator as defined in claim 1, in which said display devices are supported on a translucent circuit board, and said pattern-bearing foil is located adjacently underneath said circuit board.

4. An illuminator as defined in any of claims 1, 2 or 3, in which at least one additional light source is provided and in which said pattern provides variation in the size of the spots over the foil area in a manner compensating for variation in the illumination provided by all of said light sources to said display devices.

5. An illuminator for translucent illumination of liquid crystal information-display devices mounted on a translucent-circuit board comprising a light source mounted in a position for illuminating said display device through said circuit board and a pattern of opaque spots regularly spaced in two dimensions provided on vacant areas of said circuit board, for darkening the portions of said circuit board through which said display devices are more brightly illuminated by said light source, thereby providing substantially gradient-free illumination of the readout display formed by said display devices.

6. An illuminator as defined in claim 5, in which the opaque spots of said pattern are printed on said circuit board.

7. An illuminator as defined in claim 5, in which the opaque spots of said pattern are remnants of a copper lamination of said circuit board defined by etching.

8. An illuminator as defined in any one of claims 5, 6 or 7, in which at least one additional light source is provided and in which said pattern of opaque spots has individual spot sizes providing relative darkening of the portions of said circuit board through which said devices are more brightly illuminated by the combined effect of said light sources.

9. An illuminator as defined in claim 5, in which the opaque spots of said raster are remnants of a copper lamination of said circuit board defined by machining.

10. A method of producing a screen for compensating for variations in illumination of the back of at least one liquid crystal device for translucent information display, which comprises the steps of:

determining, in the absence of any compensating screen, the illumination at intensity points distributed in a pattern equally spaced in two dimensions over the plane on which the at least one passive readout device is to be located for illumination;

determining the light absorption or blocking necessary at each pattern point for compensating for variation in illumination among pattern points, and producing a compensating screen by printing, on a transparent or translucent film or plate, a pattern of spots equally spaced in two dimensions of respective sizes corresponding to the light blocking values determined in the step above set forth.

* * * * *